United States Patent [19]

Walton et al.

[11] Patent Number: 5,029,893
[45] Date of Patent: Jul. 9, 1991

[54] VEHICLE SUSPENSION WITH AUXILIARY LEAF SPRINGS

[75] Inventors: Erlen B. Walton, Farmington Hills; David M. Preston, Drayton Plains; James L. Oliver, Pontiac; James A. Juriga, Bloomfield Hills, all of Mich.

[73] Assignee: Eaton Corporation, Cleveland, Ohio

[21] Appl. No.: 457,065

[22] Filed: Dec. 26, 1989

[51] Int. Cl.⁵ ............................................. B60G 11/02
[52] U.S. Cl. .................................. 280/718; 280/121; 280/DIG. 1; 280/714
[58] Field of Search ............... 280/121, 714, 715, 718, 280/DIG. 1

[56] References Cited

U.S. PATENT DOCUMENTS

| | | | |
|---|---|---|---|
| 1,362,037 | 12/1920 | Peterson | 267/45 |
| 2,825,578 | 3/1958 | Walker | 280/715 |
| 3,430,976 | 3/1969 | Vautier | 280/718 |
| 3,484,091 | 12/1969 | Draves | 267/54 |
| 3,869,140 | 3/1975 | Allison | 280/715 |

Primary Examiner—Kenneth R. Rice
Attorney, Agent, or Firm—P. S. Rulon

[57] ABSTRACT

Selectively engagable auxiliary leaf springs (38) for vertically supporting a vehicle chassis (32) on an axle assembly (22 or 102) in parallel with main suspension springs (34 or 114). Forward and rear ends (38b, 38a) of the auxiliary leaf springs are pivotally attached to the vehicle chassis and the axle assembly, and pivotal movement of the forward ends (38b) is inhibited or prevented by actuators (56) to engage the auxiliary leaf springs.

10 Claims, 3 Drawing Sheets

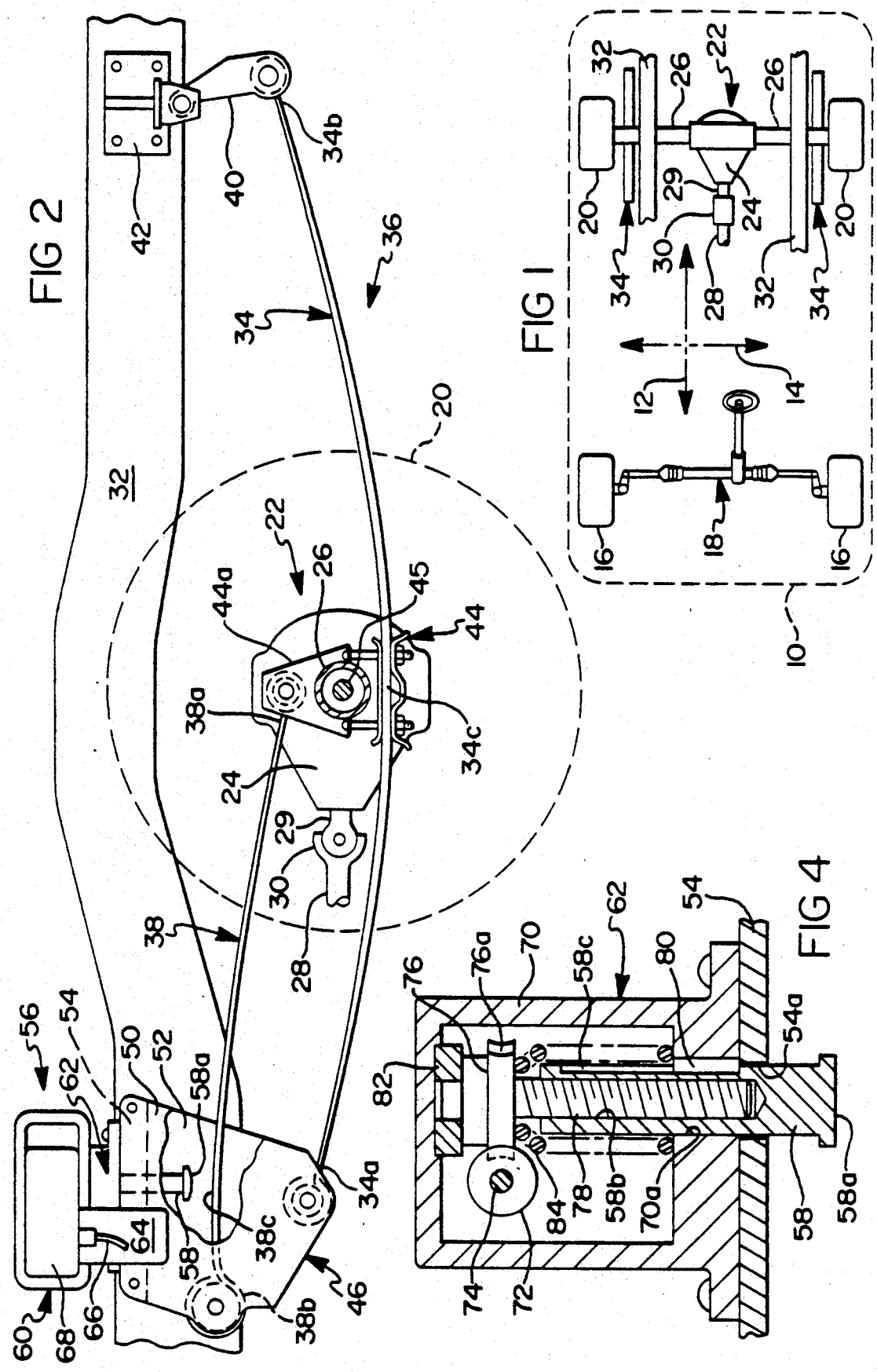

VEHICLE SUSPENSION WITH AUXILIARY LEAF SPRINGS

CROSS-REFERENCE TO RELATED APPLICATION

This application is related to U.S. application Ser. Nos. 07/456,872; 07/456,914; 07/457,025; 07/457,026; 07/457,068; 07/457,069, all filed the same date as this application; all assigned to the assignee of this application; and all incorporated herein by reference.

FIELD OF THE INVENTION

This invention relates to auxiliary or helper springs for vehicle suspension systems. More particularly, this invention relates to selectively engagable auxiliary leaf springs.

BACKGROUND OF THE INVENTION

Selectively engagable auxiliary leaf springs are known in the prior art as may be seen by reference to U.S. Pat. No. 3,484,091 to Draves, and incorporated herein by reference. The Draves patent discloses left and right ground engaging wheels rotatably mounted on opposite ends of an axle assembly extending transverse to a longitudinal axis of a vehicle chassis, left and right main suspension springs of the leaf or coil type vertically supporting the chassis on the axle assembly, left and right generally longitudinally extending auxiliary leaf springs each having an end pivotally affixed to the chassis and a unaffixed or free end, and an actuator assembly selectively operative to move the free end into load supporting engagement with the axle assembly. Such an auxiliary spring arrangement allows the main suspension springs to be designed for ride comfort when the vehicle is unloaded or lightly loaded, and is particularly well suited for light duty utility vehicles such as pick-up trucks which are used more for commuting than load hauling. However, since the auxiliary leaf springs of Draves have an unattached or free end they can only function to help support load, also the free ends of the auxiliary springs can clash against the axle and produce annoying noise.

SUMMARY OF THE INVENTION

An object of the present invention is to provide an improved auxiliary leaf spring arrangement for a vehicle.

A further object of the present invention is to provide an auxiliary leaf spring which can function as suspension system link, which can mitigate distortion of main leaf springs due to drive and/or braking torque, and which, when used with a drive axle having an unsprung differential, can readily control the drive angle between the vehicle drive shaft and the differential pinion shaft.

According to a feature of the invention, a vehicle comprises left and right ground engaging wheel assemblies rotatably mounted on opposite ends of an axle assembly extending transverse to a longitudinal axis of a vehicle chassis; main suspension springs vertically supporting the chassis on the axle assembly; first and second transversely spaced apart and generally longitudinally extending auxiliary leaf springs each having a first end pivotally affixed to the chassis, the leaf spring selectively operative to vertically support the chassis on the axle assembly in parallel with the main suspension springs in response to engagement of an actuator inhibiting pivotal movement of the first ends.

The invention is characterized by each leaf spring having a second end pivotally affixed to the axle assembly.

BRIEF DESCRIPTION OF THE DRAWINGS

A vehicle suspension system employing the auxiliary leaf springs according to the invention is shown in the accompanying drawings in which:

FIG. 1 is a schematic plan view of a vehicle;

FIG. 2 is a side elevational view of the left rear portion of a suspension system;

FIG. 4 is an elevational-sectional view of an actuator speed reducer for engaging and disengaging the auxiliary leaf spring of FIGS. 2 and 3;

DETAILED DESCRIPTION OF THE DRAWINGS

Figure 3:
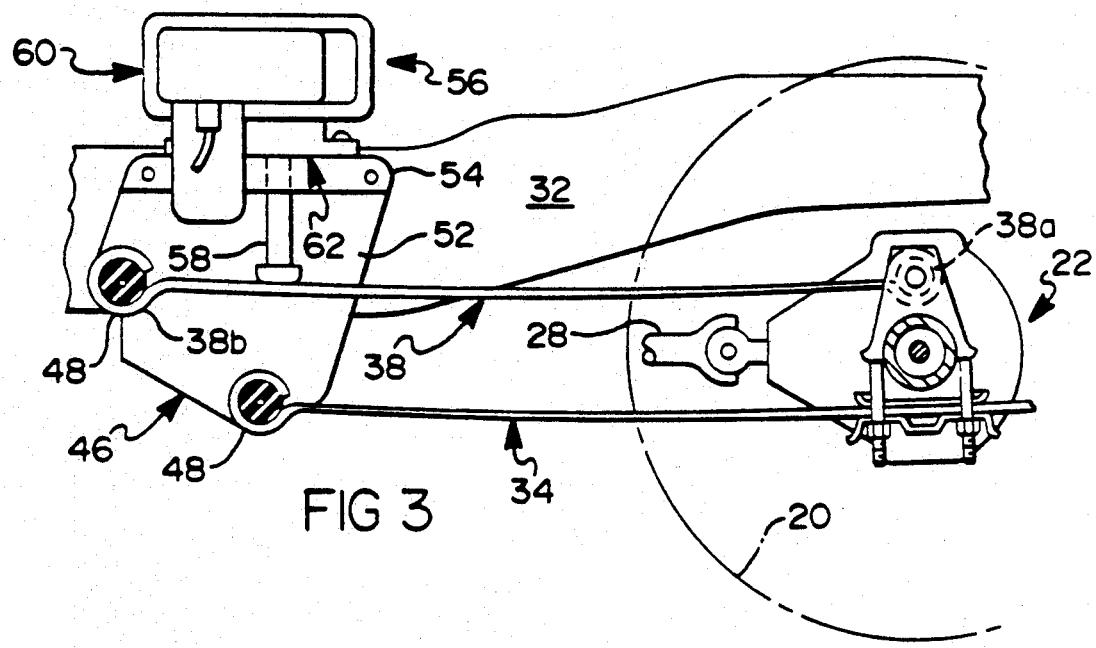
FIG. 3 is a partial view of FIG. 2 with a spring attachment plate removed to illustrate forward mounting of the main and auxiliary leaf spring ends.

The schematic plan view of FIG. 1 illustrates a wheeled vehicle having a body represented by phantom line 10, longitudinal and transverse axes 12,14, left and right front wheels 16, a steering assembly 18, for the front wheels, left and right rear wheels 20 rotatably supported on opposite ends of a rigid and transversely extending drive axle assembly 22, having a differential gear assembly disposed in a differential housing 24 rigidly affixed to transversely extending tube portions 26, an engine driven drive shaft 28 connected to the differential gear assembly pinion shaft 29 by a flexible joint such as a universal joint 30 shown in FIG. 2, partially shown chassis rails 32, and first and second longitudinally extending main leaf springs 34 each having opposite ends 34a,34b in load supporting relation (see FIG. 2) with the chassis rails and each having an intermediate portion 34c affixed to the axle assembly. For purposes of the present invention, the axle assembly 22 may be a rigid drive or non-drive axle, may support the chassis on other than leaf springs 32 (e.g., coil springs), may be other than rigid (e.g., an axle assembly for independent wheel suspension), or may be other than a rear axle.

Looking now at FIGS. 2 and 3, therein is shown a suspension embodiment 36 of the present invention for the left side of axle assembly 22. The right side is the same and is not shown for brevity. Embodiment 36 includes a known, underslung main leaf spring suspension modified to include an auxiliary or helper leaf spring 38 which is selectively engagable to vertically support the vehicle chassis in parallel with main leaf spring 34, which functions as a traction or drag link, which mitigates distortion of main leaf spring due to drive and braking torque, and which readily controls angular changes in the drive angle between drive and pinion shafts 28,29 due to distortion of main leaf spring 34 and variations in the relative vertical positions of the chassis and axle assembly.

The rear end 34b of spring 34 is pivotally attached to chassis rail 32 in known manner by a shackle and bracket 40,42. A bracket assembly 44 rigidly affixes intermediate portion 34c to the underside of axle tube 26 at a position radially spaced from the rotational and transversely extending axis of a stub shaft 45 drivingly interconnecting wheel 20, and the differential. Bracket assembly 44 includes a pair of upwardly extending and transversely spaced apart flanges 44a (only one shown) for pivotally affixing an end 38a of auxiliary leaf spring 38 to the axle assembly at a position diametrically opposite spring portion 34c. The front or forward ends 34a and 38b of the main and auxiliary leaf springs are pivotally attached to a bracket assembly 46 rigidly affixed to chassis rail 32. The pivotal attachments of the main and auxiliary spring ends may include elastomeric bushings 48 in known manner as shown in FIG. 3.

Bracket assembly 46 includes transversely spaced apart side plates 50,52 and an upper plate 54 rigidly affixed to and spacing the side plates apart. Side plate 50 is partially broken away in FIG. 2 to show side plate 52 and is cut away in FIG. 3. Upper bracket plate 54 provides a mounting surface for an actuator assembly 56 selectively operative to move a surface 58a of a reaction member 58 into and out of engagement with an upper surface portion 38c of auxiliary leaf spring 38. When surfaces 58a,38c are spaced apart, as shown in FIG. 2, auxiliary leaf spring end 38b is free to pivot and main leaf spring 38 provides sole load support for the chassis. When the surfaces are engaged, as shown in FIG. 3, pivotal movement of end 38b is prevented or inhibited and the auxiliary spring shares load support of the chassis in parallel with main leaf spring 34.

Since auxiliary leaf spring 38 is pivotally affixed at its ends 38b,38a to the chassis and the axle assembly and since the auxiliary spring between ends 38b,38a is generally in spaced parallel relation to the portion of main leaf spring 34 between end 34a and intermediate portion 34c, it also functions as a drag or traction link which mitigates distortion of main leaf spring 34 due to drive and/or braking torque and which readily controls angular changes in drive angle between drive and pinion shafts 28,29 due to main leaf spring distortion and variation in the relative vertical positions of the chassis and axle assembly. Such drive angle changes are readily controlled by varying the length of the auxiliary leaf, e.g., shortening auxiliary leaf spring 38 in embodiment 36 will provide a nose down attitude of pinion shaft 29 as the vertical distance between chassis and axle assembly decreases due to increased load on the chassis or jounce of the axle assembly. Main leaf spring 34 may be of the single or multiple leaf type. Since auxiliary leaf spring 38 is attached at both ends, it also is effective to maintain the axle assembly in position should the main leaf spring break.

Actuator assembly 56 includes first and second speed reducer assemblies 60,62 drivingly connected in series. Assembly 60 includes an electric motor 64 connectable to a source of electrical power by a wire 66, and an unshown speed reducer contained in a housing 68 and driven by the motor. Assembly 62, which is shown in vertical section in FIG. 4, includes a housing 70 rigidly affixed to upper plate 54, a worm 72 mounted for rotation in the housing about the axis of a shaft 74 driven by motor 64. The worm includes unshown teeth in mesh with partially shown teeth 76a of a worm gear 76 which is affixed to a screw 78 threadably received in a bore 58b of reaction member 58. Reaction member 58 slidably extends through a bore 70a in housing 70 and through an opening 54a in upper plate 54. A seal or boot may be provided to exclude ingress of foreign matter along the interface of member 58 and bore 70a. Rotation of the reaction member is prevented by an elongated keyway 58c slidably received by a key 80 affixed to housing 70. The threaded relation between screw 78 and bore 58b provide a mechanism for linearly moving reaction member into engagement with auxiliary spring portion 38c in response to rotation of gears 72,76. Upward thrust acting on reaction member 58, screw 78 and worm gear 76 is reacted by housing 62 through a thrust bearing 82, and these components are biased upward by a spring 84. Actuator assembly 56 may be any of several well known speed reducer assemblies capable of engaging reaction member 58 and sized for engaging the reaction member only prior to chassis loading requiring the auxiliary springs or capable (as herein) of engaging and varying the position of the reaction member under load. Assembly 60 is obtainable through the Eaton Corporation Truck Components Division in Galesburg, Mich., U.S.A. under part number 113700.

FIGS. 5-9 schematically illustrate alternative embodiments of main suspension springs in combination with the auxiliary leaf springs of the present invention, and/or with alternative actuator assemblies for the auxiliary leaf springs. In these embodiments like components will be identified by like reference numbers.

Figure 5:
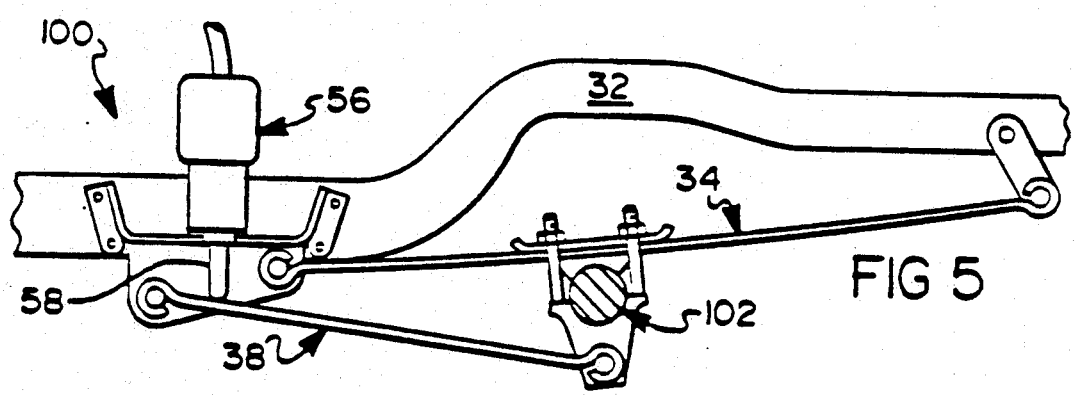
FIGS. 5 and 6 illustrate the auxiliary leaf spring employed with different suspension systems.

In the suspension embodiment 100 of FIG. 5 auxiliary leaf spring 38 is employed with an over slung main leaf spring 34 attached to the top of an axle assembly 102 which may be a rigid non-drive axle, as shown, or drive axle as in FIGS. 2 and 3. Actuator assembly 56 though different in outer appearance is basically the same as in FIGS. 2-4.

Figure 6:
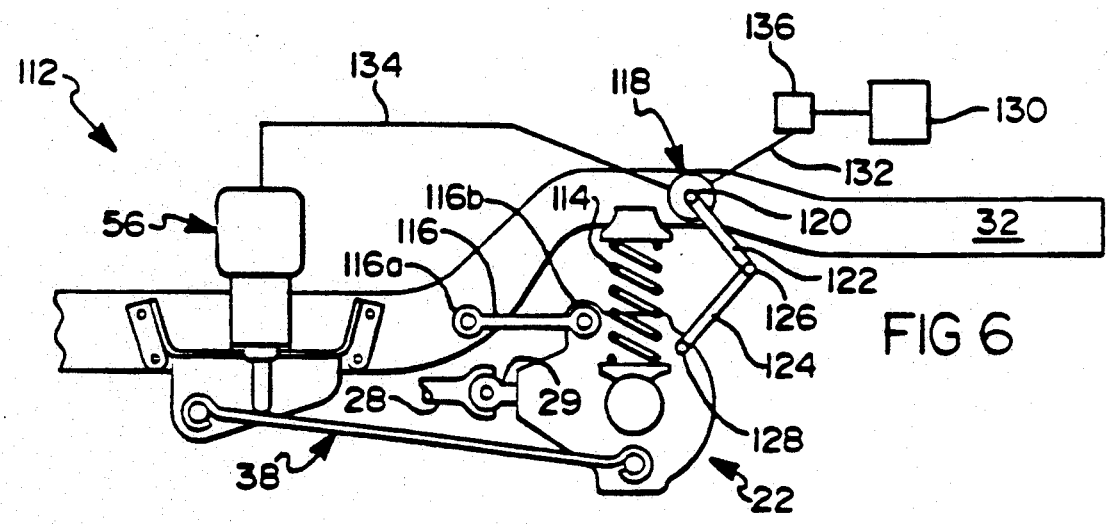

FIG. 6 schematically illustrates a suspension embodiment 112 wherein auxiliary leaf spring 38 and actuator assembly 56 are employed with a main suspension spring 114 of the coil type supporting the chassis on an axle assembly which may be of the drive or non-drive type. The embodiment of FIG. 6 includes a wishbone type link 116 pivotally attached at forward ends 116a to the chassis rails and at the rear end 116b to the axle assembly. Link 116 and auxiliary leaf spring 38 react against drive and braking torque and control the angular relation of drive and pinion shafts 28,29 in the same sense as the main and auxiliary leaf springs in FIGS. 2 and 3. Accordingly, the relative lengths of spring 38 and link 116 may be varied to provide different angular relations. Actuator assemblies 56, as well as the actuator assemblies in FIGS. 2, 5, 7, 8, and 10, may be controlled by a position means or rotary switch 118 having a housing affixed to the chassis and a rotatable shaft 120 connected to the axle assembly by links 122,124 pivotally connected together at 126, pivotally connected to the axle assembly at 128, and fixed to shaft 120. The angular position of shaft 120 represents the relative vertical relation of the chassis and axle assembly. Rotation of the shaft opens and closes switches to connect a source of electrical power 130 to the actuator assembly via wires 132,134. The actuator may be deactivated by a relay switch 136 which opens under certain conditions, e.g., when the vehicle is in motion. In some installations a position switch may be provided on each side of the vehicles, as explained further hereinafter.

Figure 7:
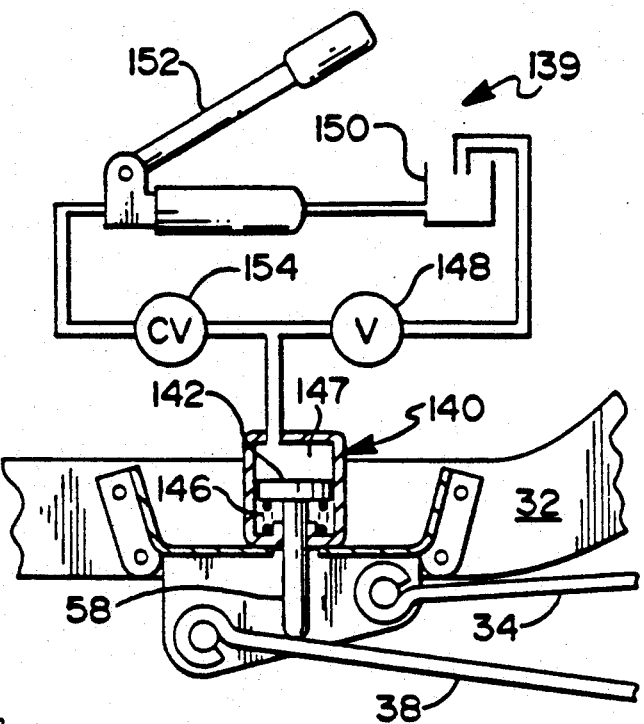
FIGS. 7-9 illustrate alternative control systems of engaging and disengaging the auxiliary leaf spring of FIGS. 1, 5 and 6.

FIG. 7 schematically illustrates a hydraulic control 139 including a hydraulic cylinder 140 having the slidable piston 142 therein affixed at one end to a reaction member 58. The piston is preferably biased upward by a spring 146. The other end of the piston and the cylinder define a fluid chamber 147 selectively pressurized by hydraulic fluid in response to closing of a manually operated valve 148 connected to a reservoir 150 and by manual operation of a hand operated pump 152 which transmits pressurized fluid to the cylinder via a check valve 154.

Figure 8:
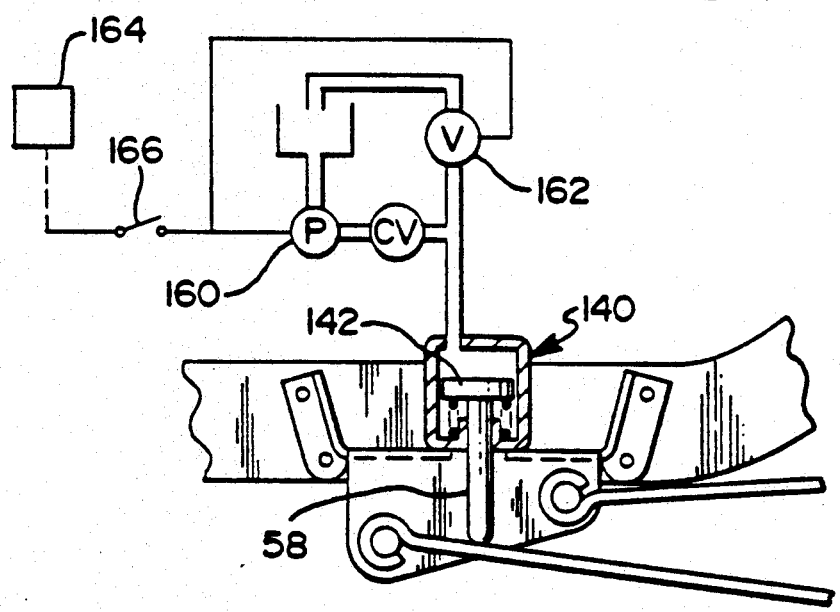

FIG. 8 illustrates the hydraulic control of FIG. 7 employing an electrically powered pump and valve 160,162 in lieu of the manual pump and valve in FIG. 7. A source of electrical power 164 is provided to the pump and valve by a manually operated switch 166. Alternatively, switch 166 may be replaced by the rotary and relay switches 118,136 of FIG. 6.

Figure 9:
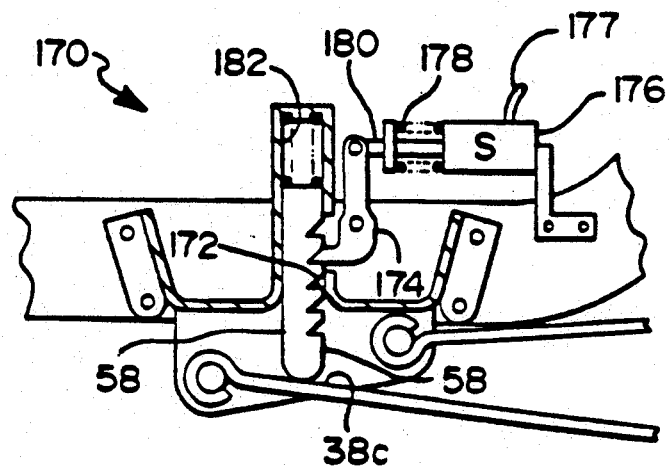

FIG. 9 illustrates an actuator assembly 170 wherein the position of a reaction member 58 having ratchet teeth 172 is controlled by a pivotal pawl assembly 174 movable into and out of engagement with ratchet teeth 172 in the reaction member. The pawl is engaged by a solenoid assembly 176 connectable to a source of electrical power via a conduit 177. A spring 178 extends the solenoid armature 180 to pivotally disengage the pawl when the solenoid of the solenoid assembly is de-energized. The reaction member is biased downward by a spring 182 with a force sufficient to overcome the force spring 178 acting on the ratchet teeth. To prevent a constant current drawn when the armature is engaged, the solenoid or pawl assemblies may include a latching mechanism. For example, the solenoid assembly may include a latching mechanism which holds the armature in the engaged position when the solenoid is initially energized to engage the pawl and which unlatches in response to momentary re-energization of the solenoid. Alternatively, the position of pawl 174 may be controlled by a manually operated push-pull arrangement such as a bowden wire, cables, or rods.

Several embodiments of the invention have been disclosed for illustration purposes. Many variations of the disclosed embodiments are believed to be within the spirit of the invention. The following claims are intended to cover inventive portions of the disclosed embodiments and modifications thereof which are believed to be within the spirit of the invention.

What is claimed is:

1. A vehicle comprising left and right ground engaging wheel assemblies rotatably mounted about an axis on opposite ends of an axle assembly extending transverse to a longitudinal axis of a vehicle chassis having front and rear ends; main spring means vertically supporting the chassis on the axle assembly; first and second transversely spaced apart and generally longitudinally extending auxiliary leaf springs each having a first end pivotally affixed to the chassis, the leaf springs selectively operative to vertically support the chassis on the axle assembly in parallel with the main spring means in response to engagement of an actuator means inhibiting pivotal movement of the first-ends; characterized by:

each of the leaf springs having a second end pivotally affixed to the axle assembly;

the main spring means including first and second transversely spaced apart and generally longitudinally extending main leaf springs each having a forward end affixed to the chassis by means for allowing pivotal and preventing linear movement between the forward end and the chassis, a rear end affixed to the chassis by means for allowing pivotal and linear movement between the rear end and the chassis, and an intermediate portion rigidly affixed to the axle assembly at a position vertically spaced from the axis; and the first end of each auxiliary leaf spring being pivotally affixed to the chassis at a position forward of the main leaf spring forward end and the second end pivotally affixed to the axle assembly at a position vertically spaced from the axis and on a side of the axle assembly opposite the main leaf spring intermediate portion and, the first and second ends pivotally affixed to the chassis and axle assembly by means for preventing linear movement of the first and second ends relative respectively to the chassis and axle assembly, whereby the auxiliary leaf spring always functions as a traction link for mitigating main leaf spring distortion due to drive and braking torque and which selectively functions as a helper spring in response to engagement of the actuator means.

2. The vehicle of claim 1, wherein the axle assembly defines a housing having mounted therein for rotation about the axis left and right stub shafts drivingly connected at one end respectively to the left and right wheel assemblies and driven at the other ends by a differential gear assembly having a pinion shaft driven by a longitudinally extending drive shaft through a flexible joint.

3. The vehicle of claim 2, wherein each main leaf spring intermediate portion is positioned on an upper side of the axle assembly.

4. The vehicle of claim 2, wherein each main leaf spring intermediate portion are positioned on an under side of the axle assembly.

5. The vehicle of claim 1, wherein the actuator means includes a reaction means selectively operative to react between the chassis and a portion of each auxiliary leaf spring at a position thereon intermediate the first and second pivotally attached ends.

6. The vehicle of claim 1, wherein the actuator means including at least one speed reduction gear assembly disposed in housing means affixed to the chassis, the gear assembly including an input gear drivingly connected to an input drive, an output gear driven by the input gear, the output gear drivingly connected to the reaction means and operative to move the reaction means into and out of contact with the portion of each auxiliary leaf spring in response to to-and-fro rotation of the input drive.

7. The vehicle of claim 6, wherein the at least one speed reduction gear assembly comprises first and second speed reduction gear assemblies respectively associated with the first and second auxiliary leaf springs, each gear assembly having the housing thereof affixed to the chassis and each having linear drive means therein operative to linearly move the reaction means into and out of contact with the auxiliary leaf spring portion in response to to-and-fro rotation of the input and output gears.

8. The vehicle of claim 7, wherein the first and second speed reduction gear assemblies respectively includes first and second electric motors each drivingly connected to the associated input gear via an intermediate speed reducer.

9. The vehicle of claim 1, wherein the auxiliary leaf springs are of the single leaf type.

10. The vehicle of claim 1, wherein the main leaf springs are of the single leaf type.

* * * * *